United States Patent [19]

Lundbom

[11] 3,983,677

[45] Oct. 5, 1976

[54] METHOD OF MANUFACTURING CANDLES WITH DECORATIVE ITEMS CAST INTO THE SURFACE THEREOF

[76] Inventor: Terry L. Lundbom, P.O. Box 235, Christmas, Mich. 49862

[22] Filed: July 3, 1974

[21] Appl. No.: 485,717

[52] U.S. Cl. ........................................ 53/3; 264/80; 264/234; 264/247; 264/250; 264/277; 425/803

[51] Int. Cl.$^2$ .......................................... B29D 31/00

[58] Field of Search ............ 425/803; 431/288, 289; 264/80, 139, 162, 245, 246, 247, 275, 277, 256, 250, 234; 53/3

[56] References Cited

UNITED STATES PATENTS

| | | | |
|---|---|---|---|
| 3,411,856 | 11/1968 | Crumrine, Jr. | 264/139 |
| 3,454,413 | 7/1969 | Miller | 264/80 |
| 3,619,456 | 11/1971 | Taylor, Jr. | 264/245 |
| 3,737,511 | 6/1973 | Dillon | 264/256 |
| 3,744,956 | 7/1973 | Hess | 431/288 |
| 3,759,478 | 9/1973 | Schmitt et al. | 264/247 |

FOREIGN PATENTS OR APPLICATIONS

| | | | |
|---|---|---|---|
| 862,897 | 3/1961 | United Kingdom | 264/80 |

*Primary Examiner*—Robert F. White
*Assistant Examiner*—T. E. Balhoff
*Attorney, Agent, or Firm*—D. Edward Dolgorukov

[57] ABSTRACT

This application discloses a method for making a candle with stones, or other desired articles, cast into the candle about the periphery thereof. This is accomplished by the use of a two step casting process, wherein a smaller core of the candle is first cast, and this core is then placed in a larger mold of substantially identical shape. The stones or other articles are then placed in the larger mold between the smaller core and the inner wall of said mold until the space therein is completely filled. Wax is then poured into the larger mold to cast these articles into the surface of the candle. Since the wax at this point will almost completely cover the articles, which are of a decorative nature and of which more of the surface should be exposed, the candle, after it has cooled, is repeatedly dipped in hot wax to remove some of the surface wax from the candle with each dipping, and then cooled by dipping the candle in water. Repetitions of this process results in the removal of a substantial amount of wax from the outside of the candle, leaving the surface of the decorative stones or other items more fully exposed to produce a very attractive candle. The finishing step to remove excess wax and smooth rough spots is in the form of exposing the surface of the candle to a concentrated heat source, such as a propane torch.

13 Claims, 8 Drawing Figures

METHOD OF MANUFACTURING CANDLES WITH DECORATIVE ITEMS CAST INTO THE SURFACE THEREOF

This invention relates to a method for the manufacture of decorative items with articles cast into the surface thereof, and more particularly, to an improved method of manufacturing wax candles with stones or similar items cast into the surface about the periphery of said candle. It has long been a problem in the candle making art on how to produce a decorative candle with articles either applied to, or cast into, the surface of the candle.

One common method of applying decoration to a candle involves applying the decorations to the surface of the candles with some type of adhesive such as glue. This may be done by applying glue to the outer surface of the candle and lowering the candle in the decoration to be applied such as glitter etc. However, this produces a candle of very limited durability, due to the fact that glue will not adhere readily to the wax, with the result that the glitter will quickly fall off, and the decorative qualities of the candle are lost.

With this method of decorating the surface of a candle producing such poor results, another method that was tried was to cast the candle inside a clear glass container, and then apply the decoration to the surface of the glass container with an appropriate adhesive. This method produced more acceptable results because adhesives were available by which the decorations desired to be applied could be readily made to adhere to the glass, and this method has found wide acceptance. However, the Applicant was not satisfied with this method because of the increased cost due to the necessity of the glass container, and the special glues necessary, and more importantly, to the limited nature of the items that could be glued to the glass surface. Such items usually being limited to small flakes of glitter or the like.

Applicant, due to his proximity to the lake areas of the United States, sought an easy way to apply such items as the stones found on the beach, to the surface of the candle. Applicant felt that such stones would make a strikingly decorative candle due to the naturally polished surface of the rocks because of the action of the water thereon. Applicant immediately saw that trying to glue the stones to the surface of the wax candle, or to the surface of glass container, would not be practical due to the irregularity in the shapes of the stones and their varying size. Applicant next tried casting the stones into the surface of the candle by lining a candle mold with the rocks, and pouring the wax in the mold.

Several difficulties were encountered with this method of making the rock candles. First of all, there was no practical way to line the sides of the candle mold with the rocks without the use of some sort of adhesive. The use of adhesive of course is one of the prime things that the Applicant was trying to eliminate in making his decorative candles. Furthermore, the adhesive prevented the wax from completely surrounding the rocks, and in some cases made for a rather unattractive appearance of the finished product. In addition to introducing casting difficulties.

It was seen that some type of support for the rocks other than an adhesive was needed. After much experimentation, the use of the two step process disclosed below developed, in which the rocks were held in place by an inner candle core and the outer wall of a larger mold. It is this process that ultimately proved satisfactory.

Therefore, it is one of the objects of the present invention to provide a method for manufacturing candles or the like with rocks or similar decorative articles cast in the surface thereof, without the use of any adhesive to hold said articles in place.

Another object of the present invention is to provide a process to manufacture a decorative rock candle wherein the rocks are held in the surface of the candle itself without the aid of any adhesive.

Another object of the present invention is to provide an improved method for manufacturing decorative candles wherein objects are contained in the surface of the candles, rather than applied to any intermediate surface, such as glass.

Another object of the present invention is to provide a method of manufacture for decorative wax candles wherein many types of decorations may be cast into the surface of the candles without regard to the size or shape of the articles.

A further object of the present invention is to provide a two step manufacturing method for decorative wax candles, in which an inner core is first cast and placed inside a larger mold, the decorative items inserted between the core and the wall of the larger mold, wax is poured over the decorative items to cast them into the candle, and excess wax is removed by a dipping process.

A still further object of the invention is to provide a simple and relatively inexpensive method of producing decorative wax candles, without the need for adhesive to hold the candle decorations in place.

A still further object of the present invention is to provide a method of the above nature which is relatively simple and dependable an operation, is dependable in results, and is relatively inexpensive.

Further objects and advantages of this invention will be apparent from the following description and appended claims, reference being had to the accompanying drawings forming a part of this specification, wherein like reference characteristics designate corresponding parts in the several views.

It is to be understood that the invention is not limited in its Application to the details of construction and arrangement of parts illustrated in the accompanying drawings, since the invention is capable of other embodiments and of being practiced or carried out in various ways within the scope of the claims. Also it is to be understood that the phraseology and terminology employed herein is for the purpose of description and not of limitation.

Furthermore, although the steps in the method of the present invention, for ease of illustration will be shown as they could be done manually, it is well within the spirit of the present invention and the scope of the claims for some, if not all, of the steps in the present method to be performed automatically by machines.

In addition, the present invention can be used to manufacture a large variety of articles, and is not limited to candles.

Figure 1:
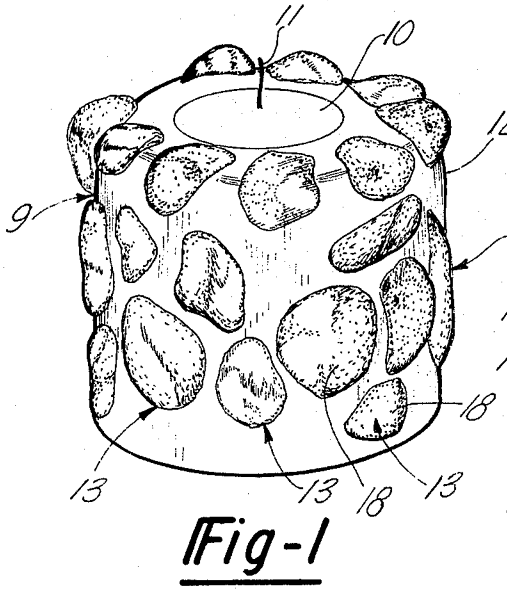
FIG. 1 is a perspective view of a decorative candle which can be manufactured by the process of the present invention.

In accordance with the present invention, there is shown in FIG. 1 a perspective view of a finished candle produced according to the method of the present invention. Such candle, generally designated by the numeral 9, comprises an inner core 10 in which is contained a wick 11. Around the inner core 10, is an outer core 12, in which are embedded the decorative articles, in this case rocks, all of which generally designated by the numeral 13.

Figure 2:
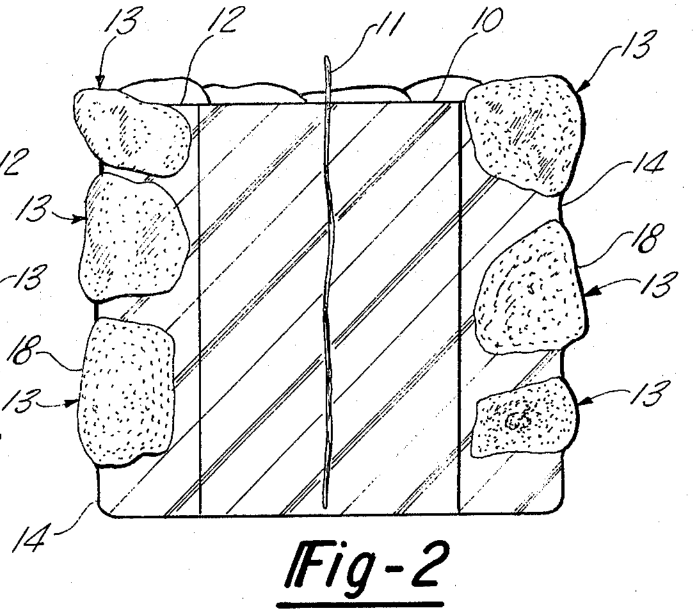
FIG. 2 is a sectional view through a vertical center line plane of the construction shown in FIG. 1.
Figure 3:
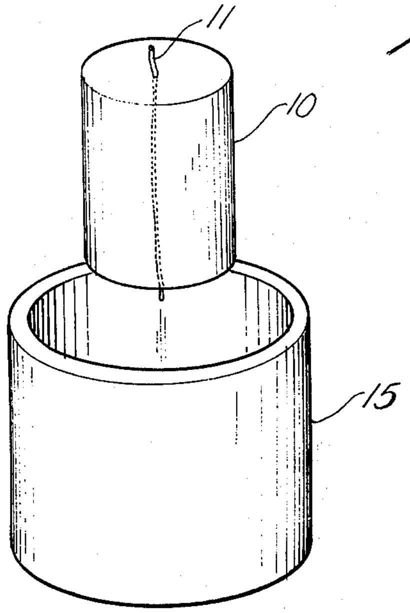
FIG. 3 is an exploded view of a step in the method of manufacture of the present invention, wherein the inner wax core is being placed into a larger mold.

It can be seen from FIG. 2, that the rocks 13 are actually embedded in the surface 14 of the outer core 12 as a result of the present method, with approximately half their volume above the surface 14 and half below.

After the size of the finished candle has been decided upon, and the size of the rocks selected which will be most attractive for the candle involved, an inner wax core of an appropriate size is cast. This inner wax core has a diameter which is smaller than the outside diameter of the candle by a factor of 100 to 150 percent of twice the average diameter of the stone being used, or:

$$x = y - 2d \text{ (percent factor)}$$

where $x$ = diameter of inner core,
$y$ = outside diameter of candle desired
$d$ = average diameter of stone For purposes of illustration, let us assume that we desire a candle with an outside diameter of 6 inches and a height of 3 inches, and that we are using stone of 1 inch average diameter. If we use a percentage factor of 1.5 (150%)

$$x = 6 - (2 \times 1)(1.5) = 6 - 3 = 3 \text{ inches}$$

so the core of the candle would be 3 inches in diameter. The height of the core would be identical to the desired height of the finished candle, or 3 inches.

In accordance with the present method, the inner wax core for the finished candle is then cast. For purposes of continuing with the above illustration, we can assume that the inner wax core 10 is what is known in the art as a 3 × 3 core, that is 3 inches in diameter and 3 inches in height. This core is preferably made from a "135 melt" wax. This is the term in the art for wax which will begin to melt at a temperature of 135° Fahrenheit. When using a "135 melt" wax, Applicant prefers to pour the inner core at a temperature from 170° to 190° for best results and ease of handling.

It should be understood that any "melt" wax can be used for pouring the core, and that any of the commonly available melt waxes from a "110 melt" wax to a "200 melt" wax can be used and produce satisfactory results. Also, just as any melt wax can be used, any temperature can be used for pouring the wax, from the melting point of the particular wax, to its flash point. However, for speed and safety, applicant prefers pouring in lower range of possible temperatures for speed and safety.

After the inner core 10 is poured, the core containing the wick 11, is placed centrally inside a larger candle mold designated by the numeral 15.

It should be understood that this method is equally applicable to candles of all sizes and shapes, as the method of the present invention works equally well with larger diameter candles, as well as taller candles, candles of different shapes, or a combination of all three. Any practicable size or shape candle can be made, depending on the availability of the molds therefor.

Figure 4:
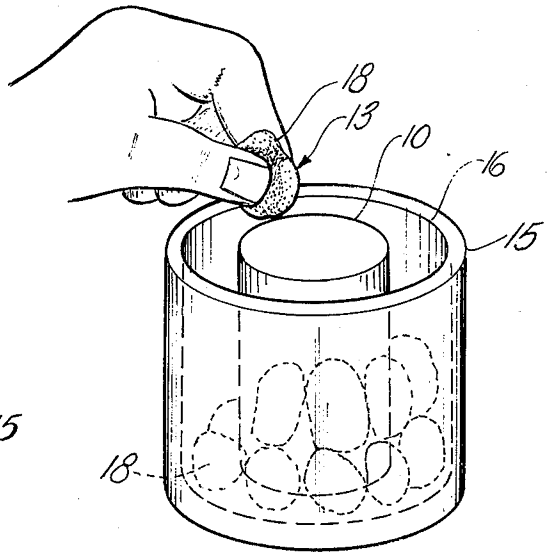
FIG. 4 is a diagrammatic view of a step in the method of the present invention, wherein the rocks are being placed between the wax core and larger mold of FIG. 3.

The next step in the present invention is to select the most appealing side of the decorative article which is being cast into the candle. In the case of the stones being used for the present illustration, the most decorative face would be chosen. It is generally accepted that stones have "two faces", the face being one of the two flatter parts of the stone. The most decorative face 18 of the stone 13 would be placed, as shown in FIG. 4, between the inner core 10 and the larger mold 15, with the most decorative face placed against the inner wall 16 of the mold 15, so that in the finished product it would be facing toward the viewer.

The stones 13 would be placed between the core 10 and the wall 16 in a circular pattern, and built up layer by layer without the use of any adhesive.

This sequence of placing the stones is much preferred in the present method in order to achieve a pleasing pattern with no voids, and so that the stones as placed in the mold will help support themselves naturally without any adhesive.

The next step of the present method is to cast the outer core of the candle. Just as when pouring the inner core, any "melt" wax and any pouring temperature, from the melting point of the particular wax being used to its flash point can be used for the outer core of the candle. However, in certain cases, it may be preferable to have a fixed relationship between the melting point of the wax in the outer core and that in the inner core. For example, if you were making a rather small size candle, it may be desirable to make the outer core of a higher melt wax to avoid the possibility of the wax in the outer core 12 being softened by the heat produced by the flame burning the wick 11 from loosening the stones 13, possibly causing them to fall out.

However, for most applications, Applicant prefers to also make the outer core 12 of a "135 melt" wax. When using a "135 melt" wax for the outer core, the temperature of the wax when pouring the outer core is preferably between 190° and 210°, or somewhat hotter than when casting the core 10. This is due to the fact that the wax must not cool in the mold before it has a chance to completely surround the stones and let air bubbles which may be trapped underneath and around the stones escape to the surface of the wax, so that they will not destroy the appearance of the finished candles. Also it has been found by the Applicant that some gases can be released from the surface of the stones themselves, and these must also be allowed to escape. Correspondingly, higher or lower temperatures would be used for other "melt" waxes.

Figure 5:
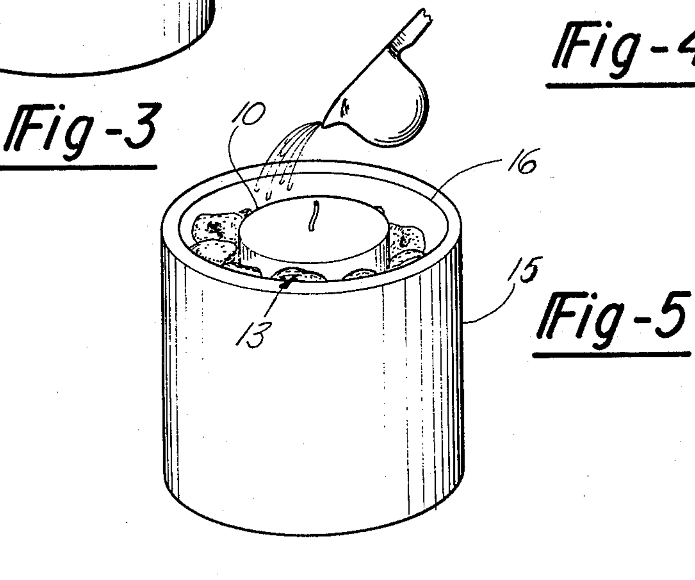
FIG. 5 is a diagrammatic view of the second casting step in the method of the present invention.
Figure 6:
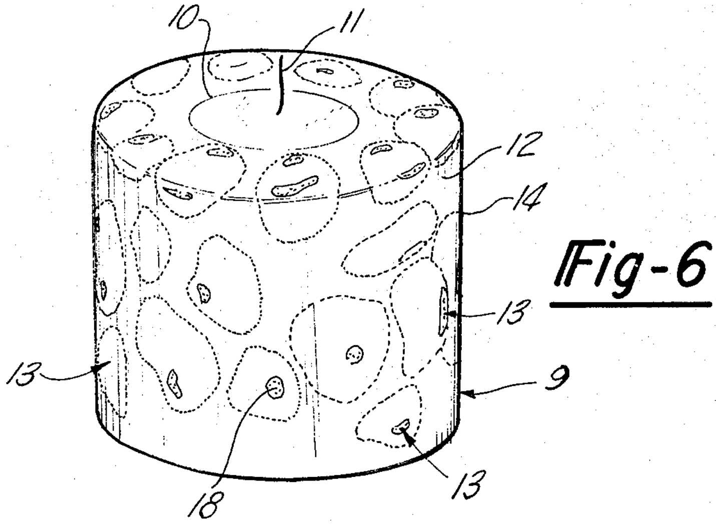
FIG. 6 is a perspective view of a construction which can be manufactured by the method of the present invention, after undergoing the step illustrated in FIG. 5, and shows the stones of the decorative candle almost completely covered by wax.

After the second casting of FIG. 5, the candle is allowed to cool, and is removed from the mold 15, producing an unfinished product similar in appearance to that shown in FIG. 6, wherein the stones 13 are almost completely covered with wax. In order to bring out the decorative qualities of the candle, it is necessary to remove some of the surface wax further exposing the faces 18 of the rocks 13.

Figure 7:
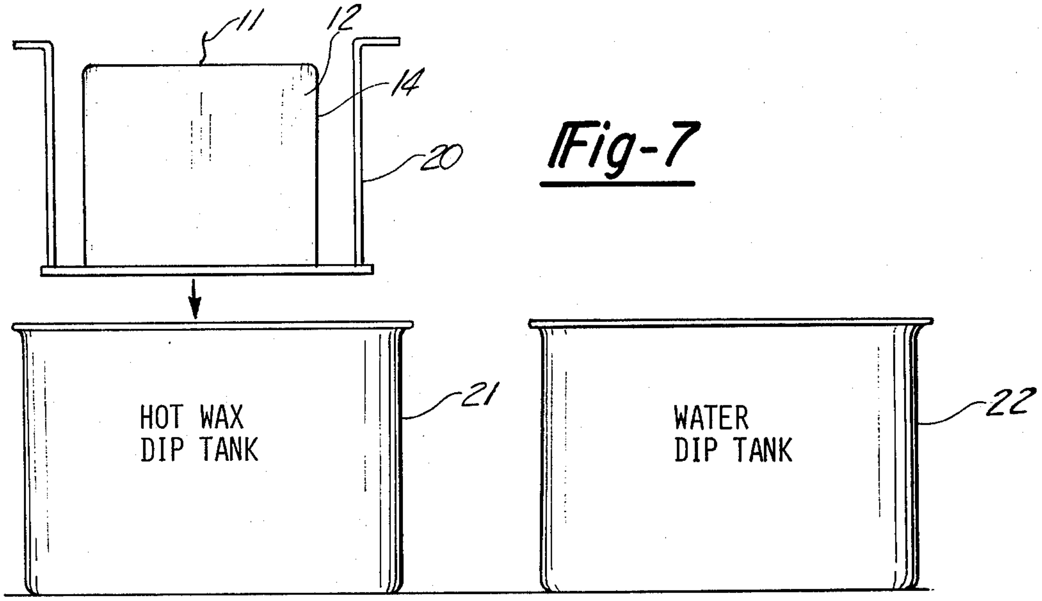
FIG. 7 is a diagrammatic view of the dipping steps in the method of the present invention.
Figure 8:
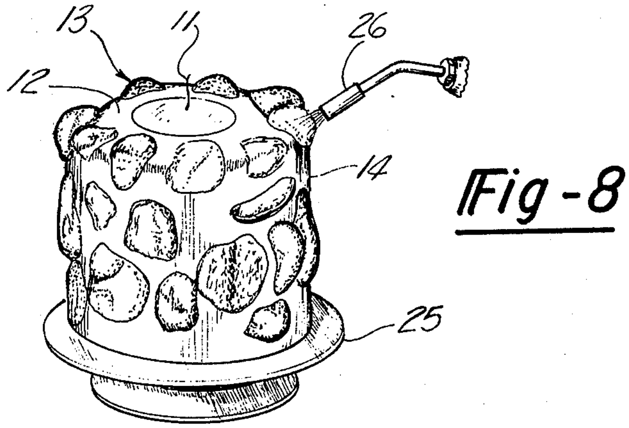
FIG. 8 is a diagrammatic view of the finishing process of the present invention.

After the candle has cooled, it is placed in a dip tray 20 as shown in FIG. 7. This dip tray 20 is adapted to fit into a hot wax dip tank 21, in which is contained the molten wax (not shown). When a "135 melt" wax is used for the outer core 12, the temperature of the molten wax is preferably from 170° to 190° Fahrenheit. This is a temperature sufficient to remove a little of the surface wax of the outer core 12 each time the candle is dipped into the hot wax dip 21, but not so hot as to cause excessive removal of wax and the possibility of the stones loosening and falling out. At the above temperature, the candle is dipped and removed from the molten wax in the hot wax dip tank 21 approximately 15 times, and at the end of this time is placed for cooling in the water dip tank 22 containing cold water (not shown). After the candle has completely cooled from being placed in the water dip tank 22, the hot wax dipping process just described is repeated again to remove more wax from the surface 14 of the outer core 12. After 15 more dippings in the hot wax dip tank 21, the candle is again placed for cooling in the water dip tank 22 until it is cool.

After cooling, the hot wax dipping and water cooling just described is repeated again, for a total of 3 times, after which time the candle is removed for further processing.

It should be understood that the number of dippings in the hot wax dip tank, and the number of times the hot wax dip and water cooling process are repeated will depend on the size and shape of the candle, and the temperature of the wax dip, which although moderate temperatures are preferred, could be anywhere from the melting point to the flash point of the particular wax being used. The ideal number of dipping and cooling cycles must be determined for each size candle.

After the candle is completely cool, it is removed from the dip tray 20 and placed on a revolving turntable 25, where the finishing step takes place.

This finishing step consists of exposing the surface of the candle to a concentrated heat source such as the propane torch 26 illustrated. The torch 26 is directed, at the operator's discretion, to portions of the candles surface which may have had excess wax left deposited after the dipping and cooling process, or to the surface of the stones 13 to remove any wax remaining on the surface thereof. At the operator's discretion, when the candle has achieved its finished appearance, it is removed from the turntable 25 for the conventional packaging operations, such as placing an identifying sticker on the bottom of the candle, and packaging it in cellophane or the like.

There is thus provided an improved method for manufacturing decorative candles with stones or similar articles embedded in the surface around the periphery thereof.

I claim:

1. A method for the manufacture of candles having decorative articles such as rocks, stones, or the like cast into the surface thereof, said method including the steps of selecting the finished size of said candles to be manufactured, selecting the size of said articles to be cast into the surface of said candle, casting a first portion of said candle in the form of an inner wax core of a size smaller than the outside diameter of said candle by from 100% to 150% of twice the average size of the articles to be cast in the surface of said candle, placing said inner core in a free standing manner in a central position in a larger opaque mold substantially the size of said finished candle, placing said articles between said inner core and the inner wall of said larger mold, casting the balance of said candle by pouring molten wax of a predetermined temperature into said space, allowing said candle to cool and removing it from said mold, removing excess wax from said candle and said articles by dipping said candle in a molten wax bath a predetermined number of times, cooling said candle by dipping it in cold water, repeating said dipping and said cooling operation a second predetermined number of times, removing said candle from said water, placing said candle on a revolving turntable, and finishing the candle by selectively exposing the surfaces of the decorative articles, where needed, to a concentrated heat source, solely for the purpose of removing excess wax from the articles embedded in the candle to expose more of said article, and not for the purpose of affecting the surface of the candle itself.

2. A method for the manufacture of decorative candles having rocks cast into the surface thereof, said method including the steps of selecting the finished size of the candle to be manufactured, selecting the size of the rocks to be cast into the surface of said candle, casting a first portion of said candle in the form of an inner wax core of a size smaller than the outside diameter of said candle by from 100% to 150% of twice the diameter of said rocks so as to insure proper support for said rocks when said wax is poured so that the decorative effect achieved by the careful placing of the rocks is not lost, said inner core also being of a predetermined melt wax, placing said inner core in a larger opaque mold of sufficient strength, and having an inner and outer wall and being of substantially the same size as the finished candle, placing said rocks between said inner core and the inner wall of said larger mold, casting the remaining portion of said candle by pouring wax of a predetermined melt type at a predetermined temperature into said space, allowing said candle to cool and removing it from said mold, removing excess wax from said candle and said rocks by a first dipping of said candle in molten wax a predetermined number of times, cooling said candle by a first dipping in cold water, repeating said dipping and said cooling a second predetermined number of times, removing said candle from said water, placing said candle on a revolving turntable, and finishing the candle by selectively exposing the surfaces of said rocks, where needed, to a concentrated heat source, for the sole purpose of removing excess wax from the surfaces of said rocks, and not to affect the surface of the candle itself.

3. The method as defined in claim 2, wherein said inner core is cast from 135 melt wax.

4. The method as defined in claim 3, wherein said molten wax being used for casting the remaining portion of the candle is also 135 melt wax.

5. The method as defined in claim 1, wherein the inner core and the remaining portions of the candle are both cast from wax having the same melting point.

6. The method as defined in claim 1, wherein said inner core and said remaining portion of said candle are waxes having a different melting point.

7. The method as defined in claim 2, wherein said casting of the remaining portion of said candle is performed with a wax having a melting point of 135° Fahrenheit, said wax being poured at a temperature of from 190° to 210° Fahrenheit.

8. The method as defined in claim 2, wherein said inner core is made of a 135 melt wax cast at a temperature between 170° and 190° Fahrenheit.

9. The method as defined in claim 5, wherein said melting point is 135°.

10. The method as defined in claim 2, and including the additional steps of placing identifying information on the bottom of the candle after it has cooled, and packaging the candle.

11. The method as defined in claim 2, wherein said rocks are placed between said inner core and said inner wall in a circular pattern and built up layer by layer.

12. The method as defined in claim 7, wherein said predetermined number of times the candle is dipped in hot wax is 15 times.

13. The method as defined in claim 12, wherein said second predetermined number of times is two, for a total of three times.

* * * * *